United States Patent [19]

Schneider

[11] Patent Number: 5,010,763

[45] Date of Patent: Apr. 30, 1991

[54] ROAD SIMULATION DEVICE

[76] Inventor: William J. Schneider, Rte. 1, Box 339, E. Bernstadt, Ky. 40729

[21] Appl. No.: 469,333

[22] Filed: Jan. 24, 1990

[51] Int. Cl.⁵ .......................................... G01M 15/00
[52] U.S. Cl. ..................................................... 73/117
[58] Field of Search ................... 73/117, 123, 126, 14, 73/146

[56] References Cited

U.S. PATENT DOCUMENTS

| | | | |
|---|---|---|---|
| 1,155,126 | 9/1915 | Bond | 73/117 X |
| 2,287,084 | 6/1942 | Bennett | 265/24 |
| 2,716,339 | 8/1955 | Cline | 73/117 |
| 3,733,894 | 5/1973 | Dahl | 73/117 |
| 3,803,909 | 4/1974 | Ostrander | 73/117 |
| 3,855,852 | 12/1974 | Cline | 73/135 |
| 3,940,978 | 3/1976 | Akkerman et al. | 73/117 |
| 4,385,518 | 5/1983 | Rickett | 73/117 |
| 4,412,455 | 11/1983 | Borgersen | 73/862.12 |
| 4,524,677 | 6/1985 | Ashman et al. | 188/72.4 X |

FOREIGN PATENT DOCUMENTS 1180189  6/1959  France ................................ 73/117

Primary Examiner—Jerry W. Myracle
Attorney, Agent, or Firm—Kalish & Gilster

[57] ABSTRACT

A road simulation device for testing a driverless, stationary motorcycle includes a longitudinal motorcycle support frame having entrance and exit ramps and a housing for supporting a rotation assembly which in turn rotatably supports the rear tire of the motorcycle being tested.

17 Claims, 2 Drawing Sheets

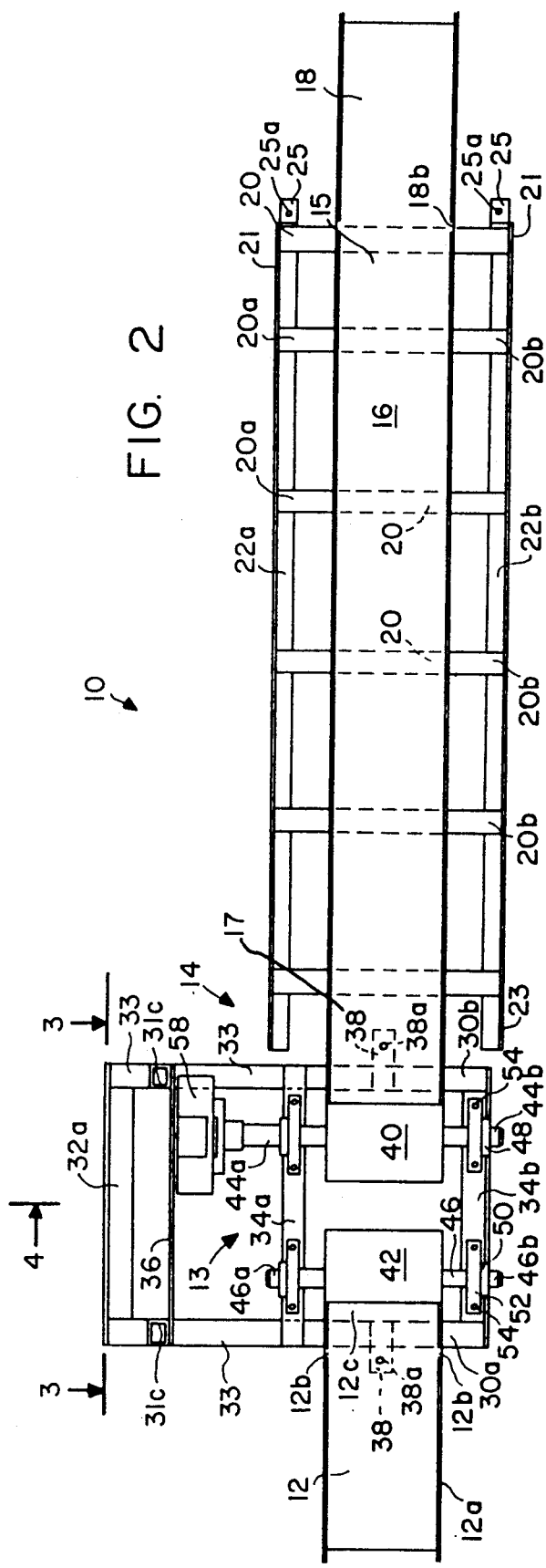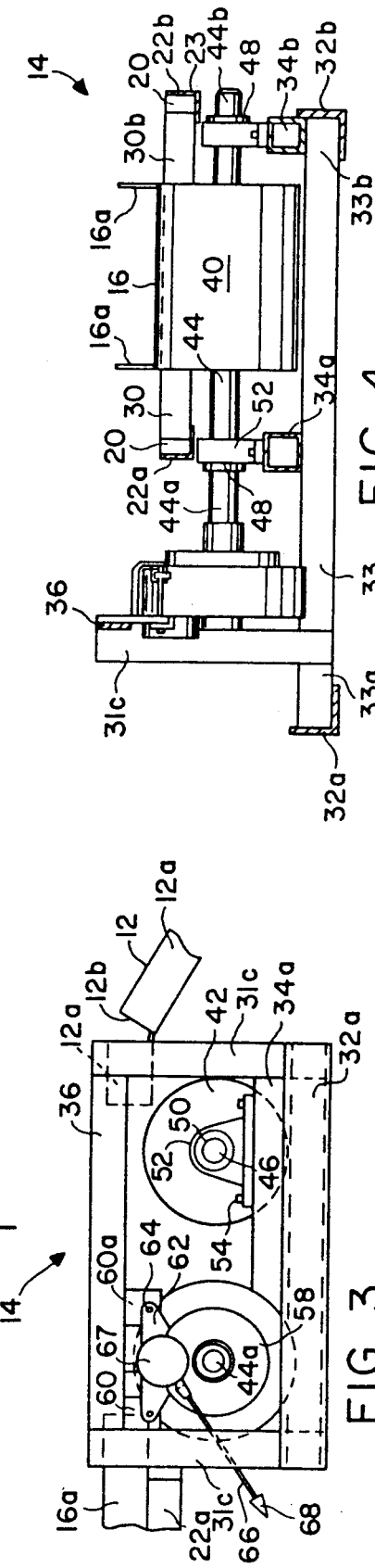

ROAD SIMULATION DEVICE

BACKGROUND AND SUMMARY OF THE INVENTION

This invention relates in general to the field of motorcycle testing devices, and more particularly, to a novel and advantageous device for simulating road conditions for demonstrating or testing a stationary, driverless motorcycle thereon.

Heretofore, devices for quantitative testing of the performance of motorcycle engines in order to measure and collect data have been known. For example, U.S. Pat. No. 2,287,084 to Bennett and U.S. Pat. No. 3,940,978 to Akkerman et al., both show devices having dynamometers for testing motorcycle engines. The Bennett apparatus lacks entrance and exit ramps, although it does have a support ramp bearing a pocket for the front motorcycle wheel. The support ramp is adjustable in order to accomodate motorcycles of various lengths. As in Akkerman et al., the Bennett device has a dynamometer that is hydraulically influenced. In Bennett, a pair of rollers is arranged to support the rear motorcycle wheel and a dynamometer is attached to the front-most roller. By contrast, in Akkerman et al. the dynamometer is attached to the rearward roller. Neither Bennett nor Akkerman et al. disclose a motorcycle test or demonstration device having a pneumatically regulated disk brake as in the present invention.

U.S. Pat. No. 3,733,894 to Dahl is also for an expensive motorcycle dynamometer for evaluating motorcycle performance but discloses a much simpler attached apparatus than those of Bennett and Akkerman et al. The Dahl dynamometer apparatus does not include a pneumatically controlled brake and contains only one roller which is barrel shaped and is effected by a manually-controlled lever. The devices of both Dahl and Akkerman et al. require the utilization of a rider on the motorcycle at the time of testing. The device shown in U.S. Pat. No. 4,385,518 to Rickett is used for testing the performance of automobiles having an engine driving traction wheel through a semi-automatic change-speed transmission. It is intended to simulate different road conditions and record data during the test. It also shows paired rollers coupled to a hydraulic displacement device, specifically, a hydraulic pump/motor unit for load, resistance, or drive to the wheels. Furthermore, it is automatically remotely controlled. The Rickett device does not disclose disk brakes nor the ramp supporting structure which is integral in the present invention.

U.S. Pat. No. 3,855,852 to Cline shows an apparatus for control of characteristics of magnetically operated friction-type power absorption devices. It specifically considers load control means for a friction absorber which are responsive to the speed of the prime mover being tested. The response to the prime mover in the Cline device creates an electrical current proportionate to the speed of the mover and provides a preselected load on the mover at a given speed. It specifically shows brake shoes and corresponding drums, not the pneumatically effected disk brakes of the presently claimed device.

As would be expected, purchasers of new or used motorcycles usually wish to inspect and observe the operation and performance of the subject of their impending purchases. Likewise, individuals building and/or repairing motorcycles necessarily require the opportunity to test the overall performance and function thereof. Historically, a number of problems have been known with road testing or demonstrating the performance of motorcycles. For a motorcycle dealership, a great liability risk exists in allowing a customer who comes in off the street to testdrive a new or used motorcycle on the highway or even in a parking lot. Such potential buyers may not be experienced in the operation of a motorcycle and pose a substantial risk to themselves, as well as to the motorcycle, if their skills are not sufficient. It is not prudent to allow a potential buyer to test drive an expensive piece of equipment such as a high performance motorcycle. Furthermore, even highly skilled motorcycle operators are subject to accidents due to the hazards imposed by other drivers and/or road and weather conditions. Similarly, a motorcycle repair shop owner/manager may prefer to have motorcycles tested within the confines of his shop in order to keep mechanics within observation distance, to decrease mechanic time spent testing motorcycles (i.e. side excursions or joyrides are avoided), to permit testing of motorcycles during inclement weather, and to decrease or eliminate insurance required to be carried upon the motorcycles being tested as well as the drivers thereof. The cost of insurance can not be minimized. Any device that reduces insurance premiums is very desirable.

The prior art does not disclose a simple, inexpensive, dynamometer-free device for realistic simulation of road conditions for safely qualitatively testing the performance or demonstrating the operating characteristics of a stationary, riderless motorcycle. The new road simulation device, as described and claimed herein, is an attempt to address the above problems.

Accordingly, it is among the several objects of the present invention to provide a device for testing the performance of and demonstrating motorcycles to potential purchasers which is simple, relatively inexpensive and safe for use by an individual having little or no training. It is intended that the device be capable of use indoors, in that the motorcycle will remain on the stationary device, and that no driver or other rider be necessary for operating a motorcycle on the device. Moreover, it is intended that no measuring devices to collect data of any kind be required for optimal use of the device and that the new apparatus be capable of accommodating motorcycles of various sizes and of simulating the effect of various road conditions, such as variations in grade, upon the motorcycle, without undue wear upon the motorcycle or parts thereof. Furthermore it is intended that the aforesaid objects be obtained without the use of hydraulic fluid or other liquid which may spill in the test area, creating a hazard of slippage and potential liability for the property owner.

In furtherance of these objects, the present invention comprises, briefly, a road simulation device for qualitatively testing or demonstrating a motorcycle. The device includes a motorcycle support frame having entrance means, exit means and a rigid, immovable one-piece longitudinal motorcycle support means extending substantially horizontally between the entrance means and the exit means and having opposing ends, one of which ends is fixed substantially adjacent to the exit means. The new device also includes vertical support means for positioning the longitudinal motorcycle support means spacedly upward from a floor at the exit end of the longitudinal motorcycle support means. A housing is disposed between the entrance means and the longitudinal motorcycle support means. A rotation assembly located within the housing includes a first roller and a second roller positioned side-by-side, horizontally parallel to each other and perpendicular to the longitudinal axis of the motorcycle support means for rotatably supporting and for forcible rotation by the rear tire of a motorcycle positioned upright upon the device. Means for applying drag (i.e. applying a retarding force against movement) are connected to the first roller and means for controlling the drag applying means are attached thereto. The new road simulation device simulates the effect of a road to permit qualitative demonstration and testing of the operation and performance of a motorcycle secured upon the device without the necessity of placing a driver on the motorcycle or of actually taking the motorcycle onto the road.

Furthermore, the invention comprises, briefly, a qualitative method of simulating the effects of various road and operating conditions upon a motorcycle. The method includes moving a motorcycle onto a road simulation device having a horizontal longitudinal axis and positioning the motorcycle vertically and longitudinally upon the device such that a front tire of the motorcycle is in stationary contact with and is supported by a rigid, immovable, one-piece longitudinal motorcycle support means having a length at least as great as that of the motorcycle and further such that a rear tire of the motorcycle is rotatably supported by a pair of side-by-side, horizontally parallel rollers rotatably secured perpendicularly to the longitudinal axis of the road simulation device. The motorcycle is subsequently secured in the position previously described prior to operating the motorcycle such that rotation of the rear tire thereof causes rotation of the paired rollers in contact therewith. A drag effect is created upon the motorcycle rear tire and varied so as to simulate the effect of various road conditions upon the motorcycle being tested, whereby to permit testing and demonstration of the operation and performance of a driverless stationary motorcycle.

Other objects and features will be in part apparent and in part pointed out hereinbelow.

BRIEF DESCRIPTION OF THE DRAWINGS

FIG. 2 is a top plan view of the road simulation device of FIG. 1.

FIG. 3 is a side elevation view taken on line 3—3 of FIG. 2.

FIG. 4 is a rear sectional view taken on line 4—4 of FIG. 2.

DESCRIPTION OF THE PREFERRED EMBODIMENT

Figure 1:
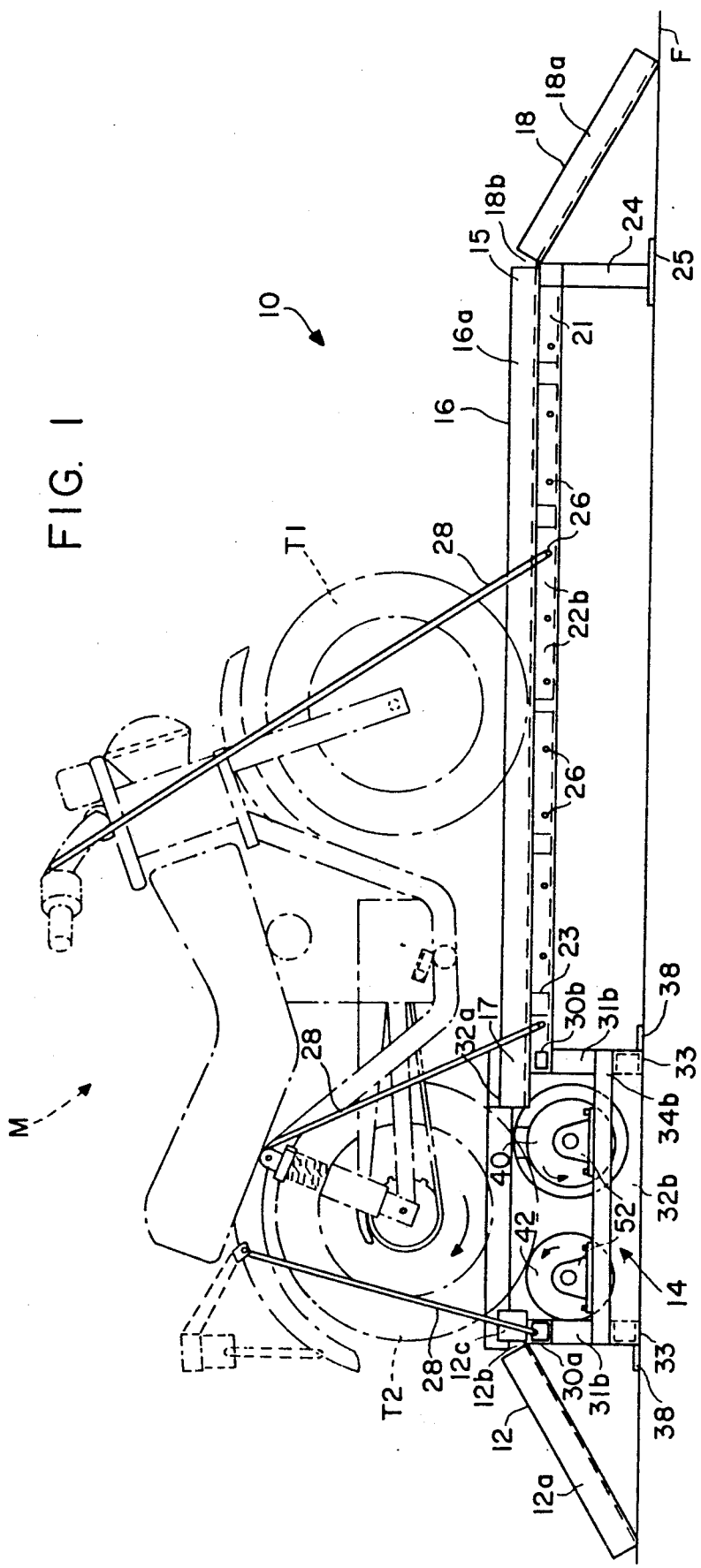
FIG. 1 is a side elevation view of a road simulation device constructed in accordance with and embodying the present invention and having a motorcycle mounted upright thereon.

Referring to the drawings, illustrated in FIG. 1 and generally designated 10 is a road simulation device constructed in accordance with and embodying the present invention. Device 10 is intended for indoor testing and demonstration of the operation of a motorcycle M (shown in phantom) vertically mounted thereon. A diagonal entrance ramp 12 leads from a floor F to a housing, generally designated 14, disposed between entrance ramp 12 and end 17 of a longitudinal motorcycle support channel 16 which terminates at its opposing end 15 in a diagonal exit ramp 18.

Rigid transverse braces 20, as illustrated in FIG. 2, (preferably at least six in number) are spaced beneath longitudinal support channel 16 to stabilize and support the length thereof. Braces 20 may be flat, but preferably are tube-like, having a substantially rectangular cross-section. Each transverse brace 20 is fastened (as by bolting or welding) at the opposing ends 20a, 20b thereof, to rigid longitudinal members 22 which travel parallel and adjacent to opposing sides 16a, 16b of longitudinal motorcycle support channel 16. Rigid longitudinal members 22 are preferably L-shaped in cross-section and formed typically of angle-iron or alternatively of wood. Thus, for stability, ends 20a of transverse braces 20 may be seated securely in the juncture formed by the sides of longitudinal member 22a and preferably fastened, as by bolting or welding, thereto. Likewise, ends 20b of transverse braces 20 may be seated in the juncture of corresponding longitudinal member 22b. For strength, transverse braces 20 are preferably formed of two inch by two inch 11 gauge metal tubing.

Rigid longitudinal members 22a, 22b each have opposing ends 21, 23; ends 21 being directed toward exit ramp 18 and ends 23 being directed toward rotation assembly 14. Similarly, longitudinal motorcycle support channel 16 includes opposing ends 15, 17; end 15 being directed toward exit ramp 18 and end 17 being directed toward rotation assembly 14. Ends 21 are supported spacedly above a floor F or other level support surface by, for example, legs 24, positioned and firmly attached therebeneath, as by fastening (by bolts not shown) through holes 25a provided in feet 25 (FIGS. 1 and 2) fixed as extensions on legs 24 (FIG. 2). A plurality of apertures 26 (preferably at least eleven in number) are spaced along the length of each longitudinal member 22a, 22b approximately six inches apart for securement of straps 28, (such as cargo straps) used in turn to detachably secure motorcycle M upon road simulation device 10. Preferably at least 3 such straps 28 are provided at different points along each rigid longitudinal member 22a, 22b, the placement of straps 28 depending upon the style and size of motorcycle 10.

For durability, entrance ramp 12, longitudinal motorcycle support channel 16, and exit ramp 18 are all composed of metal, such as steel and aluminum. However, other materials, such as wood, may be used. When formed of steel, in a preferred U-shaped cross section, ramps 12, 18 and channel 16 each have corresponding upright outer edges (or walls) 12a, 16a, 18a, respectively, for prevention of sideways slippage of the motorcycle being tested from road simulation device 10. These members can conveniently and economically be fabricated from hot-rolled steel channels. Separations, or cuts, 12b, 18b, formed in vertical walls 12a, 18a, permit bending of entrance ramp 12 and exit ramp 18 to facilitate attachment of ramps 12, 18 to device 10. Thus, as shown in FIG. 1, exit ramp 18 may actually be an extension of longitudinal motorcycle support channel 16, formed by merely making cuts 18b and bending ramp 18 downward from the point of intersection of leg 24 until ramp 18 contacts (or nearly contacts) floor F. Alternatively, exit ramp 18 may be formed separately from support channel 16. Entrance ramp 12 may also be angled at the point of cuts 12b to provide a shelf 12c which rests upon rotation assembly housing 14 (FIG. 2). Preferably ramps 12, 18 will be positioned at an angle no steeper than 30° in relation to floor F. Ramps 12, 18 are considered to provide the easiest way for moving a motorcycle on and off device 10, however, other adaptations, such as lifts, may be devised.

Disposed between entrance ramp 12 and end 17 of longtitudinal motorcycle support channel 16 and illustrated in FIGS. 2 through 4 is housing 14 for mounting therein a rotation assembly, generally designated 13. Housing 14 is preferably formed as a box-shaped framework of metal tubes (such as two inch by two inch 11 gauge tubing) or bars, as specified hereinafter, but for safety, rotation assembly 13 may be enclosed within housing 14 by walls or screens (not shown). Lengthwise housing supports 32a, 32b are positioned parallel to the longitudinal axis of motorcycle support channel 16 and rest upon floor F. Lengthwise supports 32a, 32b are L-shaped in cross section, being formed of angleiron, and are positioned with the angle formed by the juncture of the sides inward to provide a seat for lower transverse housing supports 33 which intersect lengthwise supports 32a, 32b at the opposing ends 33a, 33b thereof, respectively, so as to form a rectangle as the base of housing 14 (FIGS. 2 and 4).

Lower transverse supports 33 are preferably rectangular or square in cross section so as to provide a flat upper surface upon which to longitudinally mount roller support bars 34a, 34b (also of rectangular cross section); bar 34b being fixed near ends 33b of transverse housing supports 33 or approximately above the juncture of lengthwise housing support 32b, and roller support bar 34a intersecting at a point approximately midway along the length of each lower transverse housing support bar 33.

Extending upward from each intersection of supports 32b and 33 are vertical supports or legs 31a, 31b of equal length (legs 31a are not visible in the figures, as being hidden in FIG. 1 by legs 31b, of equal length and width). Legs 31a, 31b, support upper transverse housing supports 30a, 30b, at the upper ends thereof; support 30a providing a horizontal surface for mounting entrance ramp 12 and support 30b providing a horizontal surface at the same level for mounting end 17 of longitudinal motorcycle support channel 16.

Short tabs or feet 38 are fastened, as by welding, approximately midway along the length of each lower transverse housing support 33. Tabs 38 are provided with apertures 38a to permit passage of a fastener (not shown) therethrough for securing road simulation device 10 to floor F. It is understood that the described construction of housing 14 is preferred, but that other constructions may suffice.

Rotation assembly 13 is effectively a set of paired rollers constructed as described hereinafter. A first drum-shaped roller 40 and a second drum-shaped roller 42 are rotably mounted on roller support bars 34a, 34b by shafts 44, 46 which centrally penetrate rollers 40, 42, respectively. Shaft 46 is provided on each end 46a, 46b thereof with roller bearings 48 journalled in bushings 50 each mounted in brackets 52 attached to roller support bars 34a, 34b, respectively, as by bolt means 54. Shaft 44 which centrally penetrates roller 40 is mounted only at one end 44b similarly to roller 42. That is, (as shown in FIG. 4) shaft 44 penetrates bushings 48 mounted in brackets 56 attached to roller support bars 34a, 34b by bolts 54. However, opposite end 44a of shaft 44 mounted to roller support bar 34a, continues beyond the length of parallel shaft 46 and terminates in a conventional disk brake (or rotor-caliper assembly) 58 centrally mounted thereon. A leg 31c is connected to and rises upward from each transverse support 33 substantially adjacent to the intersections of supports 33 with lengthwise housing support 32a. Legs 31c terminate at ends opposite supports 33, (at approximately the height of support channel 16) and are connected by a longitudinal, horizontal brake support bar 36 (FIGS. 3, 4). FIG. 3 illustrates mounting flanges 60 and 60a which depend from brake support bar 36 to provide a site for mounting disk brake 58 via bracket 62 fastened thereon by threaded fasteners 64 and threaded openings (not shown) formed in bracket 62. Disk brake 58 is operated by a source of pneumatic pressure (not shown), connected by cylinder 67 to line 66 and controlled by valve 68.

Use of road simulation device 10 is as hereinafter more fully described. Motorcycle M (shown in phantom FIG. 1) is pushed or rolled up entrance ramp 12 and positioned in an upright manner such that a front tire T1 thereof rests in longitudinal motorcycle support channel 16 and rear tire T2 thereof is rotatably supported upon first and second rollers 40, 42. Rear tire T2 is typically 24 inches in diameter and rollers 40, 42 are each typically eight inches in diameter. Additionally, ramps 12 and 18 and longitudinal motorcycle support channel 16 are typically formed from "2×10" channels, i.e., being ten inches wide and having upright edges 12a, 16a, 18a two inches high. Motorcycle M is then secured in such position by at least six cargo straps 28 (preferably of two inch by ⅛ inch nylon), for example, as shown in FIG. 1, with three such straps 28 attached to the motorcycle on each side thereof. Once secured, the motorcycle may be started by, for example, an electronic ignition or a kick start mechanism (not shown). Rotation of rear tire T2 in the normal clockwise position will cause counterclockwise rotation of first roller 40 and second roller 42, both being in contact with tire T2 (arrows, FIG. 1).

Increasing air pressure from a conventional pneumatic pressure source (not shown) via valve 68, line 66 and cylinder 67 to disk brake 58 will cause increased drag (rotation resistance) to occur upon first roller 40 and thereby upon tire T2, thus causing the engine (not shown) of motorcycle M to work harder and simulating the effects of various road conditions upon it. For example, to simulate conditions such as an increase in grade of the road, carrying a passenger upon a motorcycle or towing a trailer, varying the air pressure will increase drag upon the motorcycle tire, thus causing the motorcycle engine to strain as it would in actual operation. Air pressure of eight to twelve pounds per square inch is considered to be ideal for simulating this effect, with 15 psi being the maximum pressure used.

Such operation of motorcycle M in the described position upon road simulation device 10 permits the tester or demonstrator to observe the complete performance of a motorcycle and to evaluate the entire drive train thereof, as by listening for or watching for vibrations, interference of motorcycle parts or unusual noises which should not occur. Specifically the new road simulation device of this invention permits inter alia qualitative observation of the motorcycle gearing, wheel balance, brakes, transmission, clutch, chain, electrical system, exhaust system, frame and other body parts. Indirect imposition of drag onto tire T2, via the presently claimed arrangement, with disk brake 58 connected to shaft 44 of roller 40, provides the advantages that very little wear is caused upon tire T2 and that the brake is long lasting relative to other conventional braking mechanisms, such as drum-and-shoe brakes or caliper, bicycle-type brakes which latter create drag by directly contacting a tire. No other testing or measuring equipment, such as a dynamometer, is necessary for such evaluation with the present invention and, unlike a dynamometer, the new road simulation device does not limit motorcycle testing to quantitative machine monitoring of engine function. Furthermore, no rider or driver is required. Accordingly, road simulation device 10 is a very solid, stable and inexpensive apparatus which permits a motorcycle to be tested indoors or otherwise in a stationary manner and without risk to the tester. Thus it may be seen that man hours are decreased for such testing and risk to both the motorcycle and the driver which would occur during a normal road test and which would necessitate expensive insurance coverage are eliminated.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions and methods herein described and illustrated without departing from the scope of the invention, it is intended that all matter contained in the foregoing description or shown in the accompanying drawings shall be interpreted as illustrative rather than limiting.

What is claimed is:

1. A road simulation device for qualitative testing or demonstration of a motorcycle, the device comprising:
   (a) a motorcycle support frame including entrance means, exit means, a rigid, immovable one-piece longitudinal motorcycle support means extending substantially horizontally between said entrance means and said exit means, having a length at least as long as a motorcycle to be tested or demonstrated thereon and having opposing ends one of said opposing ends fixed substantially adjacent to said exit means, and vertical support means for positioning said longitudinal motorcycle support means spacedly upward from a floor at the exit end of said longitudinal motorcycle support means;
   (b) a housing disposed between said entrance means and said longitudinal motorcycle support means;
   (c) a rotation assembly located within said housing and including a first roller and a second roller positioned side-by-side, horizontally parallel to each other and perpendicular to the longitudinal axis of the motorcycle support means for rotatably supporting and for forcible rotation by the rear tire of a motorcycle positioned upright upon said device;
   (d) drag applying means connected to said first roller; and
   (e) means for controlling said drag applying means attached thereto; whereby to simulate the effect of a road to permit qualitative testing or demonstration of the operation of a motorcycle secured upon said road simulation device without the necessity of placing a driver on the motorcycle and taking the motorcycle onto a road.

2. The road simulation device of claim 1, wherein said entrance means and said exit means are ramps extending diagonally from the floor to the corresponding ends of the longitudinal motorcycle support means.

3. The road simulation device of claim 1, wherein said vertical support means comprise legs fixedly connected beneath the exit end of said longitudinal motorcycle support means.

4. The road simulation device of claim 1, wherein said motorcycle support frame comprises stabilizing means for detachably securing the motorcycle to be tested upon said road simulation device.

5. The road simulation device of claim 4, wherein said stabilizing means comprises a plurality of straps adjustably attached spacedly along the length of said motorcycle support frame.

6. The road simulation device of claim 1, wherein said longitudinal motorcycle support means comprises a longitudinal channel member supported by a plurality of transverse members positioned therebeneath in spaced relation to each other and interconnected by bars fixedly connected thereto substantially parallel to said longitudinal channel member.

7. The road simulation device according to claim 1, wherein said housing comprises a box-shaped frame of rigid bars for mounting said rotation assembly therewithin.

8. The road simulation device according to claim 1, wherein said first roller and said second roller comprise drum rollers, each centrally penetrated by a shaft for rotatably mounting said rollers within said housing.

9. A road simulation device according to claim 8, wherein said drag applying means comprises a disk brake connected to a terminal end of the shaft penetrating said first roller.

10. A road simulation device according to claim 1, wherein said means for controlling said drag applying means comprises pneumatic pressure applying means.

11. A road simulation device according to claim 1, wherein said vertical support means of paragraph (a) terminate in immovably fixed horizontal flanges, said flanges defining through holes for passage therethrough of bolts for securing said road simulation device to the floor.

12. A method of simulating the qualitative effects of various road and operating conditions upon a motorcycle; said method comprising:
   (a) locating a motorcycle onto a road simulation device having a horizontal longitudinal axis;
   (b) positioning the motorcycle vertically and longitudinally upon the road simulation device such that a front tire of the motorcycle is in stationary contact with and is supported by a rigid, immovable, one-piece longitudinal motorcycle support means having a length at least as great as that of the motorcycle and further such that a rear tire of the motorcycle is rotatably supported by a pair of side-by-side, horizontally parallel rollers rotatably secured perpendicularly to the longitudinal axis of the road simulation device;
   (c) securing the motorcycle in the position described in Step (b);
   (d) operating the motorcycle such that rotation of the rear tire thereof causes rotation of the paired rollers in contact therewith;
   (e) creating a drag effect upon the motorcycle rear tire; and
   (f) varying the drag effect so as to simulate the effects of various road conditions upon the motorcycle; whereby to permit qualitative testing and demonstration of the operation of a driverless stationary motorcycle.

13. The method according to claim 12, wherein the step of securing the motorcycle comprises firmly, detachably connecting a plurality of adjustable straps spacedly attached along the longitudinal motorcycle support means to various positions on the motorcycle.

14. The method according to claim 13, wherein at least three such straps are detachably connected to each side of the motorcycle.

15. The method according to claim 12, wherein step (e) is comprised of applying brake means to the first roller during operation of the motorcycle.

16. The method according to claim 15, wherein said step (e) further comprises applying a disk brake which has been connected to said first roller.

17. The method according to claim 16, wherein step (f) is comprised of selectively applying pneumatic control means to the brake means.

* * * * *